(12) United States Patent
Michielsen et al.

(10) Patent No.: US 11,191,125 B2
(45) Date of Patent: Nov. 30, 2021

(54) COMMISSIONING IN MULTI-HOP NETWORKS BY USING A SINGLE-HOP CONNECTION

(71) Applicant: SIGNIFY HOLDING B.V., Eindhoven (NL)

(72) Inventors: Robin Michielsen, Eindhoven (NL); Leendert Teunis Rozendaal, Eindhoven (NL); Bas Driesen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 12 days.

(21) Appl. No.: 16/643,855

(22) PCT Filed: Aug. 27, 2018

(86) PCT No.: PCT/EP2018/073006
§ 371 (c)(1),
(2) Date: Mar. 3, 2020

(87) PCT Pub. No.: WO2019/048278
PCT Pub. Date: Mar. 14, 2019

(65) Prior Publication Data
US 2021/0068198 A1      Mar. 4, 2021

(30) Foreign Application Priority Data
Sep. 6, 2017   (EP) .................................. 17189625

(51) Int. Cl.
*H04W 84/18*      (2009.01)
*H04L 12/751*     (2013.01)
*H04W 40/28*      (2009.01)

(52) U.S. Cl.
CPC ............. *H04W 84/18* (2013.01); *H04L 45/02* (2013.01); *H04W 40/28* (2013.01)

(58) Field of Classification Search
CPC ..... H04W 40/32; H04W 4/008; H04W 84/18; H04W 12/108; H04W 12/088;
(Continued)

(56) References Cited

U.S. PATENT DOCUMENTS

| 8,908,562 B2 * | 12/2014 | Zhang | H04W 88/16 370/254 |
| 2007/0019672 A1 * | 1/2007 | Guthrie | H04W 88/06 370/466 |

(Continued)

FOREIGN PATENT DOCUMENTS

| WO | 2016057547 A1 | 4/2016 |
| WO | 2017036998 A1 | 3/2017 |

*Primary Examiner* — Jung Liu (57) ABSTRACT

The present invention relates to methods and apparatuses for controlling commissioning of a network device (22) in a multi-hop network, e.g., ZigBee network, (200) of a multi-hop technology, wherein the network device (22) is a combo network device with a single-hop communication unit of a single-hop technology, e.g., Bluetooth Low Energy (BLE), for establishing a point-to-point connection and a multi-hop communication unit of the multi-hop technology for communicating with other network devices (20) of the multi-hop network in the multi-hop network (200). The single-hop connection of the network device (22) for commissioning allows seamless transfer from controlling the network device (22) via the single-hop network to controlling the network device (22) via the multi-hop network via a bridge device (25), without running the risk of unnecessarily looking for open networks, having to look up and enter an access key or bringing the network device (22) close to the bridge device (25), and whilst maintaining a secure setup.

11 Claims, 3 Drawing Sheets

(58) Field of Classification Search
CPC ............ H04W 12/069; H04W 72/048; H04W 12/106; H04W 84/20; H04W 12/041; H04W 12/009; H04W 76/10; H04W 4/80; H04W 40/28; H04L 69/16; H04L 29/08621; H04L 9/0816; H04L 63/205; H04L 63/10; H04L 67/146; H04L 63/166; H04L 9/08; H04L 41/12; H04L 2463/061; H04L 45/02; H04L 12/751

See application file for complete search history.

(56) References Cited

U.S. PATENT DOCUMENTS

| | | | | |
|---|---|---|---|---|
| 2013/0142059 | A1* | 6/2013 | Di Girolamo | H04W 88/16 |
| | | | | 370/252 |
| 2013/0294285 | A1* | 11/2013 | Zhang | H04W 4/50 |
| | | | | 370/254 |
| 2016/0029290 | A1* | 1/2016 | Turon | H04L 69/16 |
| | | | | 370/312 |
| 2016/0105424 | A1* | 4/2016 | Logue | H04L 67/20 |
| | | | | 726/7 |
| 2016/0118793 | A1* | 4/2016 | Davis | H04B 3/54 |
| | | | | 700/295 |
| 2016/0203706 | A1* | 7/2016 | Holtman | G08C 17/02 |
| | | | | 340/12.3 |
| 2016/0373917 | A1* | 12/2016 | Logue | H04L 12/2803 |
| 2017/0006694 | A1* | 1/2017 | Davis | H04W 76/14 |
| 2018/0373304 | A1* | 12/2018 | Davis | H01H 9/56 |

* cited by examiner

COMMISSIONING IN MULTI-HOP NETWORKS BY USING A SINGLE-HOP CONNECTION

CROSS-REFERENCE TO PRIOR APPLICATIONS

This application is the U.S. National Phase application under 35 U.S.C. § 371 of International Application No. PCT/EP2018/073006, filed on Aug. 27, 2018, which claims the benefit of European Patent Application No. 17189625.1, filed on Sep. 6, 2017. These applications are hereby incorporated by reference herein.

FIELD OF THE INVENTION

The invention relates to the field of commissioning of network devices in wireless networks, such as—but not limited to—ZigBee networks, for use in various different applications for home, office, retail, hospitality and industry.

BACKGROUND OF THE INVENTION

ZigBee networks represent another type of a low-power/low-cost wireless networks which allow multi-hop communication among devices in a mesh topology. ZigBee devices offer reduced power consumption and cost, together with mesh networking capability, which make them suitable for use in large-scale deployments. Examples of application of ZigBee mesh networks include home automation, building automation, retail services, smart energy, and wireless indoor lighting systems.

More specifically, ZigBee is an IEEE 802.15.4-based specification for a suite of high-level communication protocols used to create personal area networks with small, low-power digital radios. Major benefit of the ZigBee technology is its vertical integration, i.e. availability of a complete standardized protocol stack from IEEE 802.15.4 for the lower layers to network layer to application layer specification; as opposed to other wireless network technologies, such as Thread, Bluetooth or Wi-Fi. ZigBee networks are widely used in different applications, such as home, retail, and industry/office. Applications include wireless light switches, lamps, thermostats, various sensors, electrical meters with in-home displays, traffic management systems, and other consumer and industrial equipment that requires short-range low-rate wireless data transfer. Its low power consumption limits transmission distances to 10-100 m line-of-sight, depending on power output and environmental characteristics. ZigBee devices can transmit data over long distances by passing data through a mesh network of intermediate devices.

The so-called ZigBee Light Link (ZLL) standard is a low-power mesh network standard used by connected lighting systems. During initial setup, a ZLL device performs a commissioning procedure to obtain a network key used to encrypt communication between devices in the network. Commissioning is a process in which a new ZLL network is set up or a new ZLL device is added to an existing network. The ZLL standard specifies two commissioning procedures: classical commissioning and touchlink commissioning. Each ZLL-certified device supports both commissioning procedures, which differ in key management schemes and key transport protocols.

In ZLL classical commissioning, network discovery is triggered by the device (joiner) that wants to join a network by sending beacon requests on different channels. If a coordinator of an existing ZLL network is open for new devices, this coordinator replies with a beacon response containing information about the network including a flag indicating joining permission. Then, the new ZLL device decides whether it joins the network or not. Security features of the ZLL touchlink commissioning procedure rely on a global ZLL master key used to encrypt the current network key before it is transmitted to a joining device. In the ZLL touchlink commissioning procedure, devices need to be brought close together since signal level above a certain level is required for security purposes.

However, existing ZigBee commissioning methods have disadvantages. For a factory-new device, there is a security risk when automatically searching for and joining a ZigBee network. The new device could join the wrong ZigBee network, if that network was opened, especially in case the user does not yet own an access device. Furthermore, the existing commissioning mechanism may require a user to look up an access or security code (e.g. a 6-digit hexadecimal number or so-called "install code") on the new device (meaning that the new device must be accessible and the number must be visible) and to enter this number via a software application (so-called "app") of a mobile device or to bring the new device close to the access device.

SUMMARY OF THE INVENTION

It is an object of the present invention to provide a more reliable and/or more user-friendly commissioning approach.

This object is achieved by an apparatus, by a bridge device, by a method and by a computer program product as per the claims.

Accordingly, an added point-to-point connection of a single-hop technology provides a combo network device with an enhanced user interface to an external commissioning device (e.g. tablet, smartphone, etc. as master device). This point-to-point connection can be used to exchange information required for the joining procedure and to inform the combo device that it should search for and join a (specific) multi-hop network. This allows the user to seamlessly transfer from controlling the combo device via the point-to-point connection to controlling the combo device via the multi-hop network via a bridge device, without running the risk of unnecessarily looking for open networks, having to look up and enter an access or security code or bringing the combo device close to the bridge device, and whilst maintaining a secure and reliable setup.

More specifically, a point-to-point connection (i.e. single-hop connection) to the network node (i.e. combo network device) is established by the commissioning device, and a joining procedure between the network node and the existing multi-hop network is initiated by the bridge device in order to add the network node to the multi-hop network. The point-to-point connection is used for reading from or writing to the network node at least one commissioning parameter required for the joining procedure, and an additional network connection between the commissioning device and the bridge device is used for controlling the network node via the multi-hop network after the network node has been successfully added to the multi-hop network.

According to a first option, the trigger unit may be adapted to initiate the joining procedure in response to an input operation at a user interface. Thereby, a user can trigger a joining procedure for the network node by a simple input operation at the commissioning device, e.g., by an app of a smartphone or tablet or the like.

According to an alternative second option, the trigger unit may be adapted to initiate the joining procedure in response to a detection of a presence of the bridge device. This option is advantageous in that the commissioning device automatically triggers the joining process for the network node, if a bridge device is available.

According to a third option which can be combined with the first or second option, the single-hop communication unit may be used for writing a joining start parameter to the network node, wherein the network interface may be used for instructing the bridge device to initiate a search for new devices in the multi-hop network. Then, the joining control unit of the network node may be adapted to enter a commissioning state in response to the joining start parameter written to the parameter storage unit. Thus, by providing additional functionality at the network node, the joining procedure can be directly controlled via the point-to-point connection by setting the joining start parameter (e.g. provided as an additional GATT characteristic).

According to an alternative fourth option which can be combined with the first or second option, the single-hop communication unit may be used for reading a commissioning code from the network node and the network interface may be used for forwarding the read commissioning code to the bridge device and for instructing the bridge device to initiate a search for new devices in the multi-hop network based on the commissioning code. The bridge device may be adapted to send the command containing the commissioning code to network nodes of the multi-hop network. In this case, the joining control unit of the network node may be adapted to compare an own commissioning code, stored in the parameter storage unit, with the commissioning code received from the multi-hop network together with a command for resetting to a factory new state and to initiate a reset to a factory new state and the joining procedure if the own commissioning code matches with the received commissioning code. This option is advantageous in that the network node is capable of exposing its commissioning code (e.g. a unique secret which may be provided via a GATT characteristic) via the point-to-point connection to the commissioning device, so that the commissioning device can forward it to the bridge device which can force the network node into the commissioning mode.

According to an alternative fifth option which can be combined with the first or second option, the single-hop communication unit may be used for providing network information required for joining the multi-hop network to the network node. Then, the joining control unit of the network node may be adapted to initiate the joining procedure of the multi-hop network in response to the receipt of required network information of the multi-hop network via the single-hop communication unit. This option is advantageous in that additional network information is directly provided to the network node by the commissioning device, so that the bridge device does not need to open the multi-hop network.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

Moreover, it is noted that in recent years radio chips or chip modules have evolved, in which functionality is moved towards software. As a result, high-frequency functions (specifically on the physical protocol layer (PHY layer), e.g., the actual channel modulation) may still be implemented in hardware, while lower-frequency functionality is implemented in software (specifically on the Medium Access Control layer (MAC layer) and above). Due to this, certain hardware components of the PHY layer may be reused for different radio functionalities. As a consequence, the claimed single-hop communication unit and the claimed multi-hop communication unit, which are described as separate units in the following embodiments, may in practice be implemented in a single hardware component, e.g., based on different software routines. Thus, the two communication units may be implemented as so-called software radio's wherein radio functionality at and above the MAC layer is mapped towards a software layer and wherein PHY layer functionality, which may e.g. include the actual channel modulation, are still primarily implemented in hardware. However, even when using a software radio device capable of operating in multiple-modes, when in use for single-hop communication (e.g. BLE radio), the device is still configured to operate as a single hop communication unit and when in use for multi-hop communication (e.g. ZigBee radio) it is still configured to operate as a multi-hop communication unit.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a ZigBee network as an example of a multi-hop technology based network and a Bluetooth Low Energy (BLE) connection as an example of a single-hop technology based point-to-point connection.

Recent advances in integrated circuit design have made it possible to combine Bluetooth Low Energy (BLE) and ZigBee technology on a single radio chip, allowing a low-power/low-cost device to operate as part of both a BLE network and a ZigBee network at the same time, leveraging a single wireless radio module. This may be achieved by fast switching the BLE and ZigBee device operations over time such that the device remains connected and operates in both networks simultaneously. The possibility of having a constrained device operating simultaneously on a BLE and a ZigBee networks opens up new solutions to improve limitations of these existing technologies. BLE is a low-power/low-cost wireless network technology enabling single-hop communication in a star topology between a master node and a limited number of power-constrained slave nodes. BLE provides energy-efficient connectivity between power-constrained slave devices and a less power-constrained master device. An example of a BLE network may consist of a mobile telephone device as master, which can provide Internet connectivity to an ecosystem of resource constrained devices such as sensors, wearables, and building automation devices.

In various embodiments of the present invention, BLE and ZigBee combined radio is used as an example for providing improved commissioning. However, the present invention is equally applicable to any other combination of single-hop technology (e.g. BLE, Infrared (IR), near field communication (NFC), wireless local area communication (Wi-Fi)) with multi-hop technology (e.g. ZigBee PRO, Thread, WirelessHART, SmartRF, CityTouch, IP500, and any other mesh or tree based technology).

Figure 1:
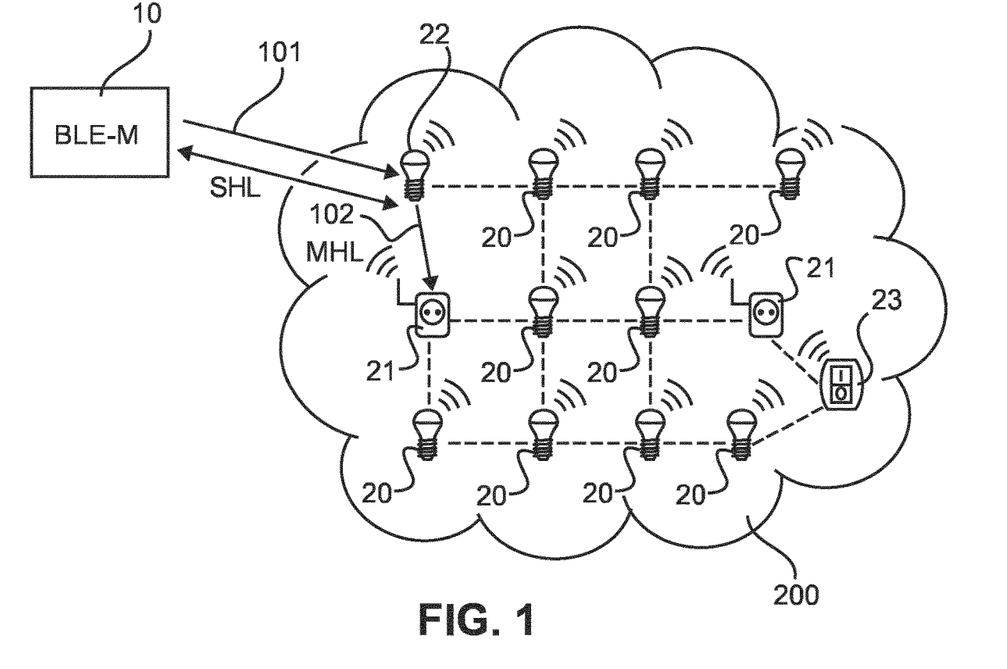
FIG. 1 shows a schematic architecture of a multi-hop lighting network with point-to-point connection to an external commissioning device according to various embodiments.

FIG. 1 shows a schematic architecture of a multi-hop ZigBee lighting network 200 with point-to-point connection (SHL) to an external commissioning device (master device, BLE-M) 10 according to various embodiments. The external commissioning device 10 may be a mobile device such as a mobile phone, smart phone, tablet, laptop or the like.

Each connected lighting system consists of at least one smart luminaire device (e.g. light bulb) 20 and a bridge device (not shown in FIG. 1, also referred to as gateway or hub) that is used as a ZigBee transceiver to communicate with the luminaire devices 20. The bridge device may connect to a home router via Ethernet or WiFi. Connected luminaire devices can be physically turned on and off using regular light switches 23. To turn on or off as well as to change color and brightness of the light, a manufacturer- or third-party app on a mobile device (or a computer) may be required. The user can use the app to send commands via the Internet and/or home router to the bridge device which translates the commands into ZigBee command frames and transmits them to the luminaire devices 20. There may also exist remote controls or dimmer switches 21 that can directly send ZigBee commands to the bulbs without connecting to the home router without involving the bridge device, or alternatively control the bulbs via the bridge device.

As described below in more detail, the single-hop connection (point-to-point connection) over Bluetooth provides a ZigBee-BLE combined-radio device 22 with an enhanced or rich user interface provided at the BLE master device (tablet, smartphone, etc.) 10. This external commissioning device 10 can be used to transmit information via a respective signal or message 101 to the combined or combo radio device 22 with two communication units (one for establishing a multi-hop link (MHL) 102, i.e., ZigBee in the exemplary embodiments, and one for establishing a single-hop link (SHL), i.e., BLE in the exemplary embodiments).

Figure 2:
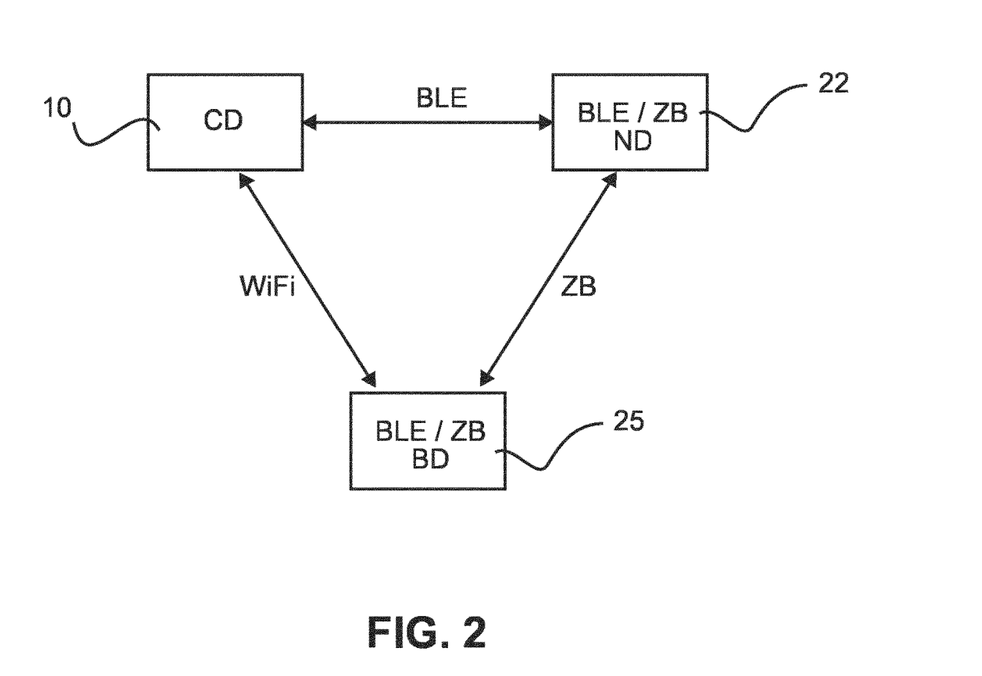
FIG. 2 shows a schematic architecture for controlling a combined radio device according to various embodiments.

FIG. 2 shows a schematic control architecture for commissioning combo radio devices in a ZigBee network.

In case a new combo radio device (BLE/ZB ND) 22 is to be added to the ZigBee network 200, it can be directly controlled via an app on the commissioning device (CD) 10 via the BLE single-hop link between the commissioning device 10 and the combo radio device 22. After the process of joining the ZigBee network (e.g. using one of the methods described in the embodiments) the combo radio device 22 can be controlled in the above direct way or indirectly via a Wi-Fi connection between the commissioning device 10 and an allocated bridge device (BLE/ZB BD) 25 and a ZigBee connection (ZB) between the bridge device 25 and the combo radio device 22.

For the combo radio device 22 with ZigBee/BLE combo radio chip to be controlled via BLE, the commissioning device 10 is paired with the combo radio device 22 via one of the known BLE pairing mechanisms (e.g., as defined by the Secure Simple pairing model or LE Secure Connections pairing model). Once the commissioning device 10 has been paired with the combo radio device 22 they have a trusted relationship.

In conventional ZigBee lighting systems, multiple mechanisms may be supported by the combo radio device 22 to join a ZigBee network that is created by the bridge device 25. First, the ZigBee network may be automatically searched for and joined when the combo radio device 22 is a factory new device. Second, a user may enter an access or security code (e.g., a 6 digit hexadecimal number or so-called "install code") that is printed on (or provided with) the combo radio device 22 into a corresponding app of the commissioning device 10. Third, the new combo radio device 22 may be touchlinked by a device already in the network (e.g. the bridge device 25 or special remote device). The second and third mechanisms also work for non-factory new combo radio devices.

According to the following embodiments of the present invention, a user can trigger the bridge device 25 via a corresponding app of the commissioning device 10 to search for and add newly found ZigBee combo devices (or ZigBee-only devices). This lets the bridge device 25 open its ZigBee network, allowing ZigBee devices to join.

Figure 3:
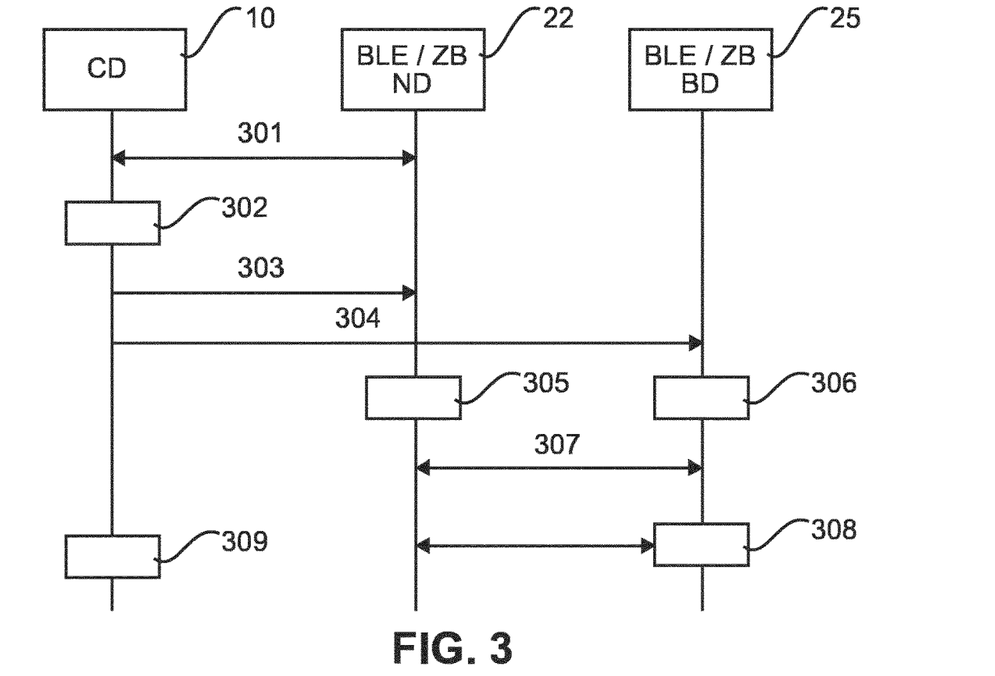
FIG. 3 shows a signaling and processing diagram of a joining procedure according to a first embodiment.

FIG. 3 shows a signaling and processing diagram of a joining procedure according to a first embodiment, where the external commissioning device (CD) 10 is used as BLE master and provides a user interface for a new combo radio device (ND) 22 which is used as BLE slave with additional ZigBee (ZB) communication unit. In FIG. 3 as well as the remaining FIGS. 4 and 5, horizontal arrows indicate signaling between devices indicated by boxes at the top of the diagrams and the blocks below the boxes of the respective devices indicate processing steps or procedures of the device located above the respective block. The time proceeds in the vertical direction from the top to the bottom of the diagrams.

In the following, a joining procedure according to the first embodiment is described with reference to FIG. 3.

To allow a new combo radio device 22 (e.g. a lamp or luminaire) to join a ZigBee network via BLE it needs to offer additional functionality via its BLE interface (next to the basic light control functionality). This could be implemented e.g. by addition of a BLE Generic Attributes (GATT) characteristic that when written initiates the lamp to enter its ZigBee commissioning state (in which it searches for a ZigBee network and when found tries to join that network). The GATT Server defines a hierarchical data structure that is exposed to connected Bluetooth LE devices. A GATT profile describes a use case, roles and general behaviors based on the GATT functionality. Services are collections of characteristics and relationships to other services that encapsulate the behavior of part of a device. This also includes hierarchy of services, characteristics and attributes used in the attribute server. GATT is built on top of the Attribute Protocol (ATT) (cf. Bluetooth Core System Architecture for block diagram and explanations) which uses GATT data to define the way that two BLE devices send and receive standard messages.

In step 301 of FIG. 3, a commissioning device 10 (e.g. smart phone) of a user is paired and bonded via BLE to the new combo radio device 22 that supports both ZigBee and BLE. Then, in step 302, the user wants to add the new combo radio device 22 to a ZigBee network of a bridge device 25 and therefore triggers this action in a corresponding app of the commissioning device 10. Alternatively, the app could detect presence of the bridge device 25 (via Wi-Fi) and automatically trigger the action to add the new combo radio device 22 to the bridge device 25.

Once the "add device to bridge" action has been triggered by the user on the app (or automatically by the app), the app writes in step 303 to the new combo radio device's "Join ZigBee network" GATT characteristic via its BLE connection with the new combo radio device 22. Additionally, in step 304, the app of the commissioning device 10 will also instruct the bridge device 25 (via its IP interface and the WiFi connection) to search for new devices. It is noted that steps 304 and 303 could be reversed in order.

Upon the writing action to the "Join ZigBee network" GATT characteristic, the new combo radio device 22 enters its ZigBee commissioning state in step 305 and will stay in that state for a pre-defined amount of time (e.g. 30 seconds). During this state, the new combo radio device 22 will look for ZigBee networks and when found will try to join that network. To make step 305 more robust, the app of the commissioning device 10 can provide data via the GATT characteristic that helps the new combo radio device 22 to uniquely identify the ZigBee network that it should join (e.g. provide the ZigBee personal area network identification (PAN ID) of the bridge device 25), and ignore other networks. This is especially advantageous in situations where multiple overlapping ZigBee networks are present.

Once the bridge device 25 receives the command of step 304 to search for new device it will open up its ZigBee network in step 306, thus permitting other ZigBee devices to join this network. Accordingly, in step 307, a joining procedure for adding the new combo radio device 22 to the ZigBee network is performed.

Then, in step 308, when the new combo radio device has joined the bridge device's ZigBee network, the bridge device 25 retrieves the device information of the newly added combo radio device 22, add the new combo radio device 22 to its internal administration in the bridge and mark it as a newly added device. It is noted that step 308 may include communication from the bridge device 25 to the commissioning device 10, so that the commissioning device 10 is informed about the newly added combo radio device 22. An alternative measure could be that the commissioning device 10 obtains some information from the combo radio device 22 that indicates successful joining the ZigBee network.

Finally, in step 309, the app of the commissioning device 10 can now inform the user that the new combo radio device 22 was successfully added to the user's bridge device 25, and update its control mechanisms to control the new combo radio device 22 indirectly via the combined Wi-Fi and ZigBee connections instead of directly via the BLE connection.

In the above, the GATT characteristic "entering the ZigBee commissioning state" could be "reset device to ZigBee factory new", but could also be more limited to just look for an open ZigBee network for a certain period—and if this fails, remain in the same ZigBee state as before (which could be part of yet another ZigBee network).

Figure 4:
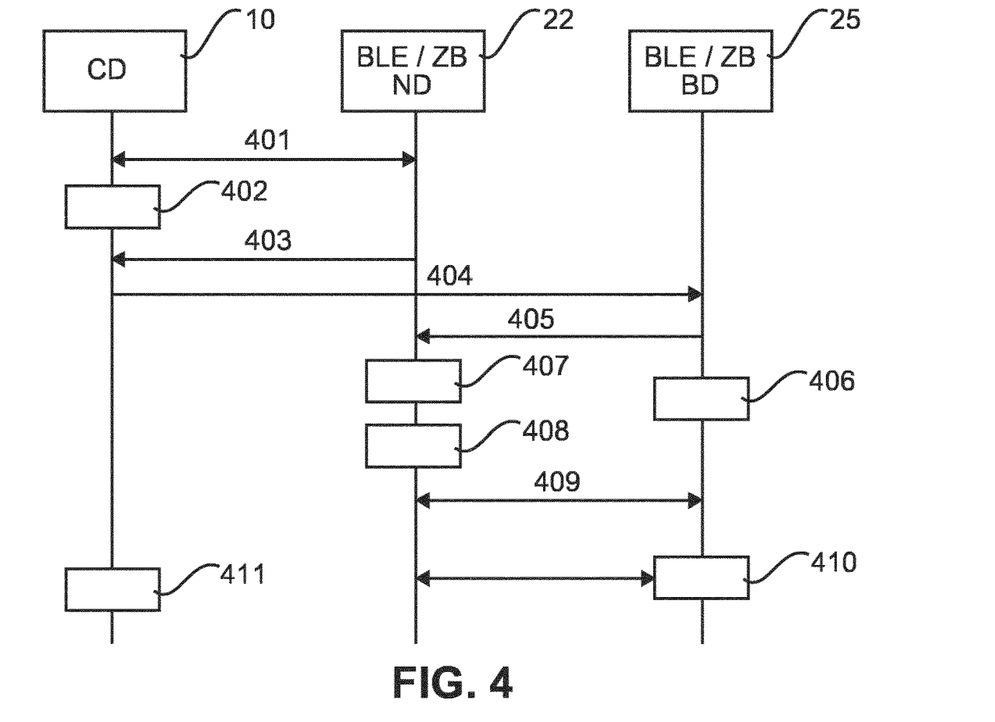
FIG. 4 shows a signaling and processing diagram of a joining procedure according to a second embodiment.

FIG. 4 shows a signaling and processing diagram of a joining procedure according to a second embodiment, where the new combo radio device 22 is adapted to expose a unique secret information (such as the 6-digit hexadecimal number or so-called "install code") via a GATT characteristic ("ZigBee commissioning code") or other appropriate means and provide that secret to the bridge device 25, which can use it to force the new combo radio device 22 into a commissioning mode, or allow combo radio device 22 to join the network.

In step 401, the commissioning device 10 of the user is paired and bonded via BLE to the new combo radio device 22 that supports both ZigBee and BLE.

If the user now wants to add this new combo radio device 22 to a ZigBee network of the bridge device 25, it triggers this action in an app of the commissioning device 10 in step 402. Alternatively, the app could detect presence of the bridge device 25 and could automatically trigger the action to add the new combo radio device 22 to the bridge device 25.

Once the "add device to bridge" action has been triggered in step 402, the app of the commissioning device 10 reads the "ZigBee commissioning code" GATT characteristic in step 403 via its BLE connection with the new combo radio device 22.

Then, in step 404, the app of the commissioning device 10 instructs the bridge device 25 (via its IP interface and the WiFi connection) to search for new devices by passing the lamp's ZigBee commissioning code as parameter.

Once the bridge device 25 has received the command to search for new devices, it will send the received ZigBee commissioning code in step 405 to all ZigBee devices, including those who are not in the network, as a command to reset themselves to factory new, if and only if the included code matches the code inside a ZigBee device, and afterwards in step 406 it will open up its ZigBee network, thus permitting other ZigBee devices to join this network, in particular the device(s) which have just reset themselves to factory new and thus want to join an open network.

In step 407, the new combo radio device 22 receives this ZigBee commissioning code, compares it with its own code and, as it matches, it resets itself in step 408 to factory new, and starts looking for an open network and when found tries to join that network in step 409.

When the new combo radio device 22 has joined the bridge device's ZigBee network, the bridge device 25 retrieves in step 410 the device information and state of the newly added combo radio device 22, adds the new device to its internal administration in the bridge and marks it as a newly added device. It is noted that step 410 may include communication from the bridge device 25 to the commissioning device 10, so that the commissioning device 10 is informed about the newly added combo radio device 22. An alternative measure could be that the commissioning device 10 obtains some information from the combo radio device 22 that indicates successful joining the ZigBee network.

Finally, in step 411, the app of the commissioning device 10 can now inform the user that the new combo radio device 22 was successfully added to the user's bridge device 25.

It is noted that the 6-digit hexadecimal number is an example of what could be used as "ZigBee commissioning code". It could also be a unique code stored inside the new combo radio device 22, which is different from the 6-digit hexadecimal number printed on the new combo radio device 22.

For improved security, the new combo radio device could as well be adapted to provide a randomly generated number as ZigBee commissioning code, which is only valid for a certain period and not reused on subsequent attempts or interactions. This greatly reduces the risk of rogue apps reading out and storing these codes for later possibly malicious usage.

In the above, the GATT characteristic "entering the ZigBee commissioning state" could be "reset device to ZigBee factory new", but could also be more limited to just look for an open ZigBee network for a certain period—and if this fails, in the same ZigBee state as before (which could be part of yet another ZigBee network).

Figure 5:
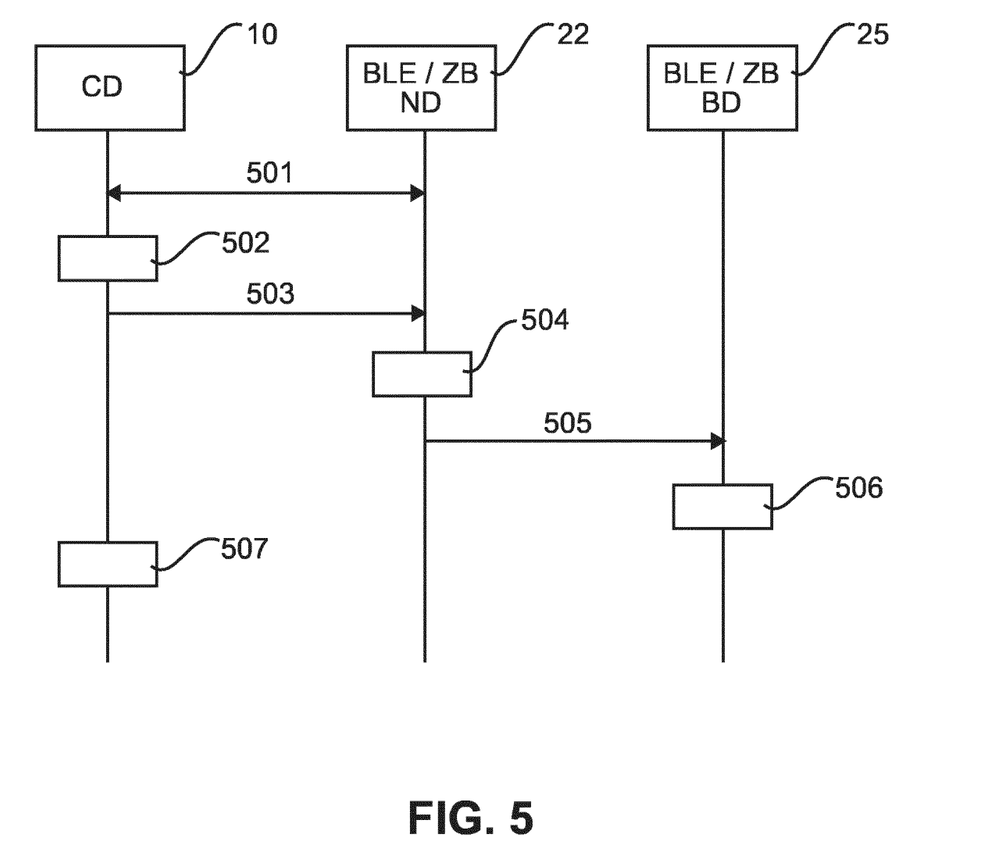
FIG. 5 shows a signaling and processing diagram of a joining procedure according to a third embodiment.

FIG. 5 shows a signaling and processing diagram of a joining procedure according to a third embodiment, where additional information is provided to the new combo radio device 22 such that the bridge device 25 does not need to open the network.

In step 501, the commissioning device 10 of a user is paired via BLE to the new combo radio device 22 that supports both ZigBee and BLE.

If the user now wants to add this new combo radio device 22 to the ZigBee network of the bridge device 25, it triggers this action in an app of the commissioning device 10. Alternatively, the app of the commissioning device 10 could detect presence of the bridge device 25 and could automatically trigger the action to add the new combo radio device 22 to the ZigBee network of the bridge device 25.

Once the "add lamp to bridge" action has been triggered in step 502, the app of the commissioning device 10 provides in step 503 network information details (such as channel, PAN ID and network key, which could be received e.g. from the bridge device 25) to the new combo radio device 22 by writing to (an) appropriate GATT characteristic(s) via its BLE connection with the new combo radio device 22. Using these network information details, the new combo radio device 22 can locate and join the ZigBee network in step 504, and announce its presence (e.g. Device Announce message) in step 505 to the bridge device 25. The bridge device 25 receives this presence announcement and either automatically or instructed by the app to be in a state to receive and process such announcements, it adds the new combo device 22 to its internal administration in the bridge and marks it as a newly added device in step 506. It is again noted that step 506 may include communication from the bridge device 25 to the commissioning device 10, so that the commissioning device 10 is informed about the newly added combo radio device 22. An alternative measure could be that the commissioning device 10 obtains some information from the combo radio device 22 that indicates successful joining the ZigBee network.

Finally, in step 507, the app of the commissioning device 10 can now inform the user that the new combo radio device 22 was successfully added to the ZigBee network of the user's bridge device 25.

The above embodiments offer a ZigBee commissioning mechanism that requires less user interaction while maintaining security and user convenience, since the user does not have to perform typical actions for joining a lamp to a ZigBee network. The feature can equally be applied to other ZigBee devices such as switches, sensors, etc. Furthermore, the proposed procedures of joining one network using information provided over another network or connection could also be applied in reverse direction (i.e., instructions how to link the commissioning device (e.g. phone) to the combo radio device (e.g. lamp) via single-hop connection (e.g. BLE) could be transferred or triggered via the multi-hop network (e.g. ZigBee network).

To summarize, methods and apparatuses for controlling commissioning of a network device in a multi-hop network, e.g., ZigBee network, of a multi-hop technology have been described, wherein the network device is a combo radio network device with a single-hop communication unit of a single-hop technology, e.g., Bluetooth Low Energy (BLE), for establishing a point-to-point connection and a multi-hop communication unit of the multi-hop technology for communicating with other network devices of the multi-hop network. The single-hop connection of the network device for commissioning allows seamless transfer from controlling the combo device via the single-hop network to controlling the network device via the multi-hop network via a bridge device, without running the risk of unnecessarily looking for open networks, having to look up and enter an access key or bringing the network device close to the bridge device, and whilst maintaining a secure setup.

While the invention has been illustrated and described in detail in the drawings and foregoing description, such illustration and description are to be considered illustrative or exemplary and not restrictive. The invention is not limited to the disclosed embodiments. The proposed joining procedures can be applied to and possibly standardized in other types of multi-hop networks and with other types of messages and control fields. Moreover, the invention can be applied in any product that implements a multi-hop network (e.g. ZigBee or others) interfacing with a single-hop network (e.g. BLE or others). An example includes a large-scale ZigBee lighting network where single light-points are commissioned using a mobile device such as smartphone or tablet via BLE. Moreover, the app-based control is a mere example. Other user interfaces with other types of input operations (e.g. hardware switches or buttons, audio control, etc.) could be provided at the commissioning device.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

As an example, in the above embodiments, the terms "mesh network", "multi-hop network" and "point-to-point connection" shall be interpreted in a sense to cover a network architecture with only one bridge and one network node (e.g. lamp). Additionally, the term "bridge device" shall be understood to cover any controller device or other device with a bridge-type functionality, such as a case where one of the luminaire devices, switch devices, or sensor devices takes that role of the bridge device. As an example, the bridge functionality might be integrated in another combo radio device, which has previously been paired to the phone via the single-hop connection (e.g. BLE), and has setup a ZigBee network. Then, this combo radio device could function both as network device (e.g. lamp) and as bridge device. In that case, the commissioning device (e.g.

smartphone) would have two single-hop connections (may be concurrent, may be time-multiplexed), one with a first combo radio device which functions as a bridge towards an existing multi-hop network (here, the communication over the "network interface" is to be understood e.g. as tunnel bridge-like commands over the single-hop connection) and one with a second combo radio device which is intended to be joined into this multi-hop network.

A single unit or device may fulfill the functions of several items recited in the claims. The mere fact that certain measures are recited in mutually different dependent claims does not indicate that a combination of these measures cannot be used to advantage.

The described operations like those indicated in FIGS. 3 to 5 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for controlling addition of a network node to a multi-hop network of a multi-hop technology comprising a bridge device, the network node being a combo network device with a single-hop communication unit of a single-hop technology for establishing a point-to-point connection and a multi-hop communication unit of the multi-hop technology for communicating with other network devices of the multi-hop network, wherein the apparatus comprises:

a single-hop communication unit of the single-hop technology for establishing a point-to-point connection to the network node;

a trigger unit for initiating a joining procedure between the network node and the bridge device in order to add the network node to the multi-hop network of the bridge device; and a network interface for establishing a network connection to the bridge device;

wherein the apparatus is adapted to use the single-hop communication unit for reading a commissioning code from the network node and to use the network interface for forwarding the read commissioning code to the bridge device and for instructing the bridge device to:

send a command to network nodes of the multi-hop network to initiate a reset to a factory new state and the joining procedure if the own commissioning code of the network node matches with the received commissioning code; and initiate a search for new devices in the multi-hop network based on the commissioning code.

2. The apparatus of claim 1, wherein the trigger unit is adapted to initiate the joining procedure in response to an input operation at a user interface.

3. The apparatus of claim 1, wherein the trigger unit is adapted to initiate the joining procedure in response to a detection of a presence of the bridge device.

4. The apparatus of claim 1, wherein the multi-hop technology is ZigBee.

5. The apparatus of claim 1, wherein the single-hop technology is Bluetooth Low Energy.

6. The apparatus of claim 1, wherein the apparatus is adapted to use the single-hop communication unit for providing network information required for joining the multi-hop network to the network node.

7. A bridge device for use in a lighting system, the lighting system comprising a commissioning device, wherein the commissioning device comprises an apparatus as claimed in claim 1, and the lighting system further comprising at least one luminaire device, the bridge device being adapted to open its multi-hop network and search for new network nodes in response to an instruction received from via the network interface;

wherein the received instruction comprises the commissioning code and wherein the bridge device is adapted to:

send the command to network nodes of the multi-hop network to initiate a reset to a factory new state and the joining procedure if the own commissioning code of the network node matches with the received commissioning code; and initiate the search for new devices in the multi-hop network based on the commissioning code;

wherein the luminaire device comprises an apparatus for controlling addition of a network node to the multi-hop network of the multi-hop technology comprising the bridge device, the apparatus comprising:

a single-hop communication unit of the single-hop technology for establishing a point-to-point connection to the commissioning device;

a multi-hop communication unit of the multi-hop technology for communicating to other network devices of the multi-hop network;

a parameter storage unit for setting at least a commissioning code required for a joining procedure of the network node to the multi-hop network of the bridge device; and a joining control unit adapted to initiate the joining procedure when the commissioning code, stored in the parameter storage unit, matches a commissioning code received from the multi-hop network.

8. A method of controlling addition of a network node to a multi-hop network of a multi-hop technology comprising a bridge device, the network node being a combo network device with a single-hop communication unit of a single-hop technology for establishing a point-to-point connection and a multi-hop communication unit of the multi-hop technology for communicating with other network devices of the multi-hop network, wherein the method comprises:

establishing a point-to-point connection to the network node;

initiating a joining procedure between the network node and the bridge device in order to add the network node to the multi-hop network of the bridge device;

establishing a network connection to the bridge device; and using the point-to-point connection for reading a commissioning code from the network node and to use the network interface for forwarding the read commissioning code to the bridge device and for instructing the bridge device to:

send a command to network nodes of the multi-hop network to initiate a reset to a factory new state and the joining procedure if the own commissioning code of the network node matches with the received commissioning code; and initiate a search for new devices in the multi-hop network based on the commissioning code.

9. The method of claim 8, wherein the multi-hop technology is ZigBee.

10. The method of any one of claim 8, wherein the single-hop technology is Bluetooth Low Energy.

11. A non-transitory computer readable medium storing instructions when executed by one or more processors cause the one or more processors to perform the steps of claim 8 when run on a computer device.

\* \* \* \* \*